United States Patent
Yankovich et al.

(10) Patent No.: US 8,762,388 B2
(45) Date of Patent: Jun. 24, 2014

(54) SIZING CONTENT RECOMMENDATION SYSTEM

(71) Applicants: Steve Yankovich, San Jose, CA (US); Ryan Melcher, Ben Lomond, CA (US); Ganga Muthyala, San Jose, CA (US)

(72) Inventors: Steve Yankovich, San Jose, CA (US); Ryan Melcher, Ben Lomond, CA (US); Ganga Muthyala, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/872,843

(22) Filed: Apr. 29, 2013

(65) Prior Publication Data

US 2013/0238614 A1 Sep. 12, 2013

Related U.S. Application Data

(63) Continuation of application No. 12/878,715, filed on Sep. 9, 2010, now Pat. No. 8,433,710.

(51) Int. Cl.
*G06F 17/30* (2006.01)
*G06Q 30/00* (2012.01)

(52) U.S. Cl.
USPC .......... 707/746; 707/769; 707/949; 705/14.4; 705/26.7; 705/28

(58) Field of Classification Search
CPC ............... G06F 17/30424; G06Q 30/0255; G06Q 30/0643; G06Q 20/12; G06Q 30/0601
USPC ............ 705/14.24, 28, 14.4, 26.7; 703/2; 707/746, 769, 949
See application file for complete search history.

(56) References Cited

U.S. PATENT DOCUMENTS

| 6,879,945 | B1 * | 4/2005 | Cook ................................ 703/2 |
| 7,714,912 | B2 * | 5/2010 | Faisman et al. ............... 348/239 |
| 8,433,710 | B2 * | 4/2013 | Yankovich et al. ........... 707/746 |
| 2002/0023087 | A1 * | 2/2002 | Vickery et al. .................... 707/7 |
| 2008/0108927 | A1 * | 5/2008 | Sinyagin ......................... 602/54 |
| 2011/0161194 | A1 | 6/2011 | Dumke et al. |
| 2012/0066208 | A1 | 3/2012 | Yankovich et al. |
| 2012/0169596 | A1 * | 7/2012 | Zhuang ......................... 345/158 |

FOREIGN PATENT DOCUMENTS

JP 2011048230 A 3/2011

OTHER PUBLICATIONS

"U.S. Appl. No. 12/878,715, Response filed Jun. 1, 2012 to Non Final Office Action mailed Mar. 1, 2012", 9 pgs.
"U.S. Appl. No. 12/878,715, Final Office Action mailed Jul. 25, 2012", 14 pgs.
"U.S. Appl. No. 12/878,715, Non Final Office Action mailed Mar. 1, 2012", 9 pgs.
"U.S. Appl. No. 12/878,715, Notice of Allowance mailed Jan. 3, 2013", 8 pgs.
"U.S. Appl. No. 12/878,714, Response filed Oct. 24, 2012 to Final Office Action mailed Jul. 25, 2012", 11 pgs.

\* cited by examiner

*Primary Examiner* — Cheryl Lewis
(74) *Attorney, Agent, or Firm* — Schwegman Lundberg & Woessner, P.A.

(57) ABSTRACT

In various example embodiments, systems and methods to provide sizing content recommendations are provided. Search parameters are received from a user. In response, sizing data for the user is accessed. Using the sizing data, content from a marketplace matching the sizing data and the search parameters are determined. The matching content comprises a list of one or more items available from the marketplace. The matching content is prioritized for presentation to the user.

20 Claims, 7 Drawing Sheets

SIZING CONTENT RECOMMENDATION SYSTEM

PRIORITY

This application is a continuation of U.S. patent application Ser. No. 12/878,715, of PRIORITY, U.S. Pat. No. 8,433,710, filed on Sep. 9, 2010, to which application is incorporated by reference herein in its entirety.

FIELD

The present disclosure relates generally to the field of computer technology, and in a specific example embodiment, to providing sizing content recommendations.

BACKGROUND

Websites provide a number of publishing, listing, and price-setting mechanisms whereby a user (e.g., a seller) may list or publish information concerning items for sale. The items for sale may be size-specific. However, the process of determining items that match a buyer's size is often time consuming and inaccurate.

BRIEF DESCRIPTION OF DRAWINGS

Various ones of the appended drawings merely illustrate example embodiments of the present invention and cannot be considered as limiting its scope.

DETAILED DESCRIPTION

Figure 1:
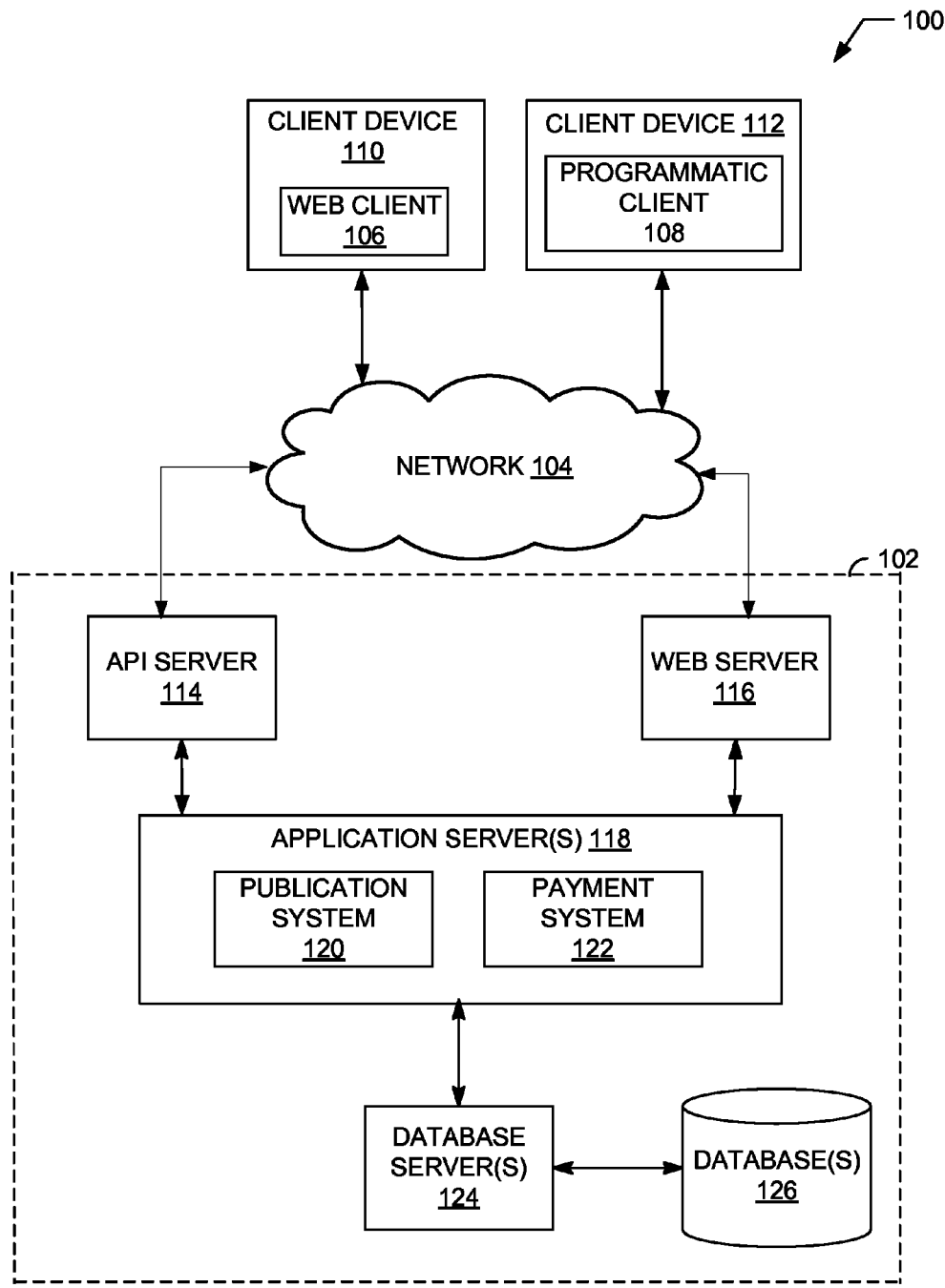
FIG. 1 is a block diagram illustrating an example embodiment of a network architecture of a system used to identify items depicted in images.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a network-based publication environment, the embodiments are given merely for clarity in disclosure. Thus, any type of electronic publication, electronic commerce, or electronic business system and method, including various system architectures, may employ various embodiments of the sizing content recommendation system and method described herein and be considered as being within a scope of example embodiments. Each of a variety of example embodiments is discussed in detail below.

Example embodiments described herein provide systems and methods for providing sizing content recommendations to a user. The user may initiate a search by providing search parameters. The search parameters may identify a type of item that the user is interested in obtaining. In example embodiments, the search parameters do not include any sizing data. Instead, the sizing data is determined by a sizing content recommendation system. In one embodiment, sizing data is determined based on an image of the user. The sizing data may comprise height, width, clothing size, shoe size, overall shape, or any other measurement of the user. In example embodiments, a marker that is a standard-sized object is included with the user in the image and used in determining the size data. In alternative embodiments, other methods of obtaining sizing data may be used (e.g., the user inputs sizing data into his user profile).

The search may be conducted by accessing one or more vendor computer systems. In one embodiment, the vendor computer system comprises a dynamic marketplace including user-generated content (e.g., users posting items for sale) of goods available for sale or auction (e.g., eBay™). In other embodiments, the vendor computer system may represent one or more merchants. Using the sizing data and search parameters, inventory or content from the vendor computer system matching the sizing data and search parameters are determined. The matching inventory comprises at least one item available for acquisition from at least one of the vendor computer systems.

The matching inventory may be prioritized for presentation to the user based on user preferences and past interactions with the vendor computer system. Prioritization of the matching inventory may incorporate one or more of user (e.g., potential buyer) preferences, past purchase history of the user, browsing history of the user, or purchase history of related users. The related users may be users (e.g., friends) that have the same or very similar sizing data. In some embodiments, the related users also have similar preferences, past purchase histories, or browsing histories.

By using embodiments of the present invention, a user that is searching for specifically sized items can easily find such items. Accordingly, one or more of the methodologies discussed herein may obviate a need for additional searching, which may have the technical effect of reducing computing resources used by one or more devices within the system. Examples of such computing resources include, without limitation, processor cycles, network traffic, memory usage, storage space, and power consumption.

For purposes of illustration, the following example embodiments are described with respect to an electronic marketplace. As discussed above, a marketplace may be one embodiment of a vendor computer system.

With reference to FIG. 1, an example embodiment of a high-level client-server-based network architecture 100 to provide recommendations for content having particular sizing (herein referred to as "sizing content recommendations") is shown. A networked system 102, in an example form of a network-server-side functionality, is coupled via a communication network 104 (e.g., the Internet, wireless network, cellular network, or a Wide Area Network (WAN)) to one or more client devices 110 and 112. FIG. 1 illustrates, for example, a web client 106 operating via a browser (e.g., such as the INTERNET EXPLORER® browser developed by Microsoft® Corporation of Redmond, Wash. State), and a programmatic client 108 executing on respective client devices 110 and 112.

The client devices 110 and 112 may comprise a mobile phone, desktop computer, laptop, or any other communication device that a user may utilize to access the networked system 102. In some embodiments, the client devices 110 may comprise or be connectable to an image capture device (e.g., camera). The client device 110 may also comprise a voice recognition module (not shown) to receive audio input and a display module (not shown) to display information (e.g., in the form of user interfaces). In further embodiments, the client device 110 may comprise one or more of a touch screen, accelerometer, or GPS device.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or databases 126. In one embodiment, the databases 126 may comprise a knowledge database that may be updated with content, user preferences, and user interactions (e.g., feedback, surveys, browsing history, purchase history).

The publication system 120 publishes content on a network (e.g., Internet). As such, the publication system 120 provides a number of publication and marketplace functions and services to users that access the networked system 102. The publication system 120 is discussed in more detail in connection with FIG. 2. In example embodiments, the publication system 120 is discussed in terms of a marketplace environment. However, it is noted that the publication system 120 may be associated with a non-marketplace environment.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account, PayPal, or credit card) for purchases of items via the network-based marketplace. While the publication system 120 and the payment system 122 are shown in FIG. 1 to both form part of the networked system 102, it will be appreciated that, in alternative embodiments, the payment system 122 may form part of a payment service that is separate and distinct from the networked system 102.

While the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
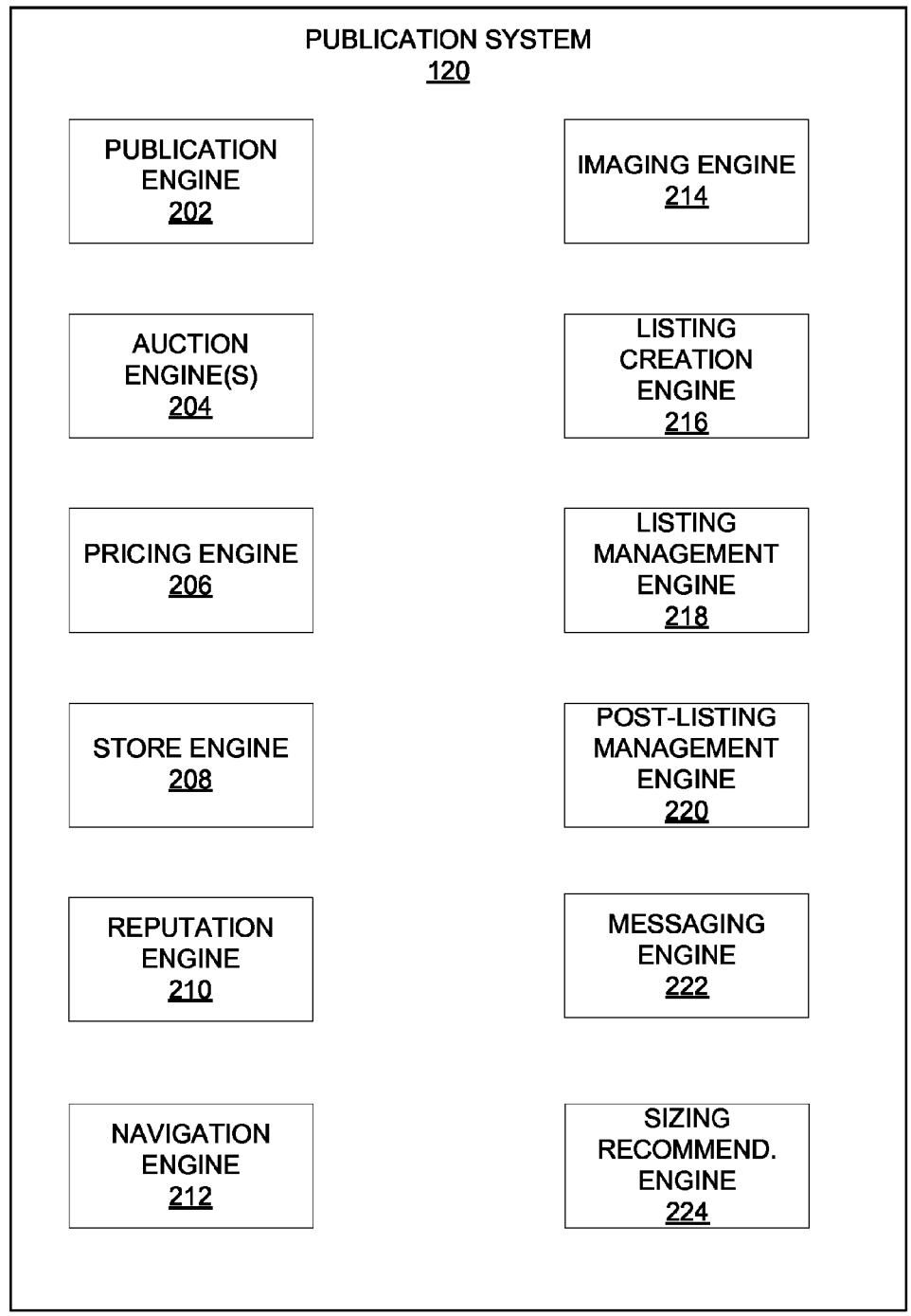
FIG. 2 is a block diagram illustrating an example embodiment of a publication system.

Referring now to FIG. 2, an example block diagram illustrating multiple components that, in one example embodiment, are provided within the publication system 120 of the networked system 102 is shown. The publication system 120 may be hosted on dedicated or shared server machines (not shown) that are communicatively coupled to enable communications between the server machines. The multiple components, themselves, are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

In one embodiment, the publication system 120 provides a number of publishing, listing, and price setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double, Reverse auctions, etc.). The various auction engines 204 also provide a number of features in support of these auction-format listings, such as a reserve price feature whereby a seller may specify a reserve price in connection with a listing and a proxy-bidding feature whereby a bidder may invoke automated proxy bidding.

A pricing engine 206 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed price that is typically higher than a starting price of an auction for an item.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, a plurality of items for auction, or a combination of both.

A reputation engine 210 allows users that transact, utilizing the networked system 102, to establish, build, and maintain reputations. These reputations may be made available and published to potential trading partners. Because the publication system 120 supports person-to-person trading between unknown entities, users may otherwise have no history or other reference information whereby the trustworthiness and credibility of potential trading partners may be assessed. The reputation engine 210 allows a user, for example through feedback provided by one or more other transaction partners, to establish a reputation within the network-based publication system over time. Other potential trading partners may then reference the reputation for purposes of assessing credibility and trustworthiness.

Navigation of the network-based publication system 120 may be facilitated by a navigation engine 212. For example, a search module (not shown) of the navigation engine 212 enables keyword searches of listings published via the publication system 120. In a further example, a browse module (not shown) of the navigation engine 212 allows users to browse various category, catalog, or inventory data structures according to which listings may be classified within the publication system 120. Various other navigation applications within the navigation engine 212 may be provided to supplement the searching and browsing applications.

The navigation engine 212 (e.g., the search module) receives search parameters from the user that initiates a search. In example embodiments, the search parameters received do not explicitly contain any user entered sizing terms. Instead, the sizing data is accessed by a sizing recommendation engine 224. For example, the sizing data may be accessed from a database (e.g., database 126) storing profile information for the user. Alternatively, for example, the sizing data may be determined on-the-fly based on an image received with the search parameters, as will be discussed in more detail below.

In order to manage images, the publication system 120 may include an imaging engine 214 that enables users to upload images for inclusion within listings and to incorporate images within viewed listings. The imaging engine 214 also receives image data from a user and utilizes the image data to identify an item depicted or described by the image data.

A listing creation engine 216 allows sellers to conveniently author listings of items. In one embodiment, the listings pertain to goods or services that a user (e.g., a seller) wishes to transact via the publication system 120. The goods may be of a particular size. Thus, the author may use the listing creation engine 216 to indicate the particular size in the listing. In other embodiments, a user may create a listing that is an advertisement or other form of publication.

A listing management engine 218 allows sellers to manage such listings. Specifically, where a particular seller has authored or published a large number of listings, the management of such listings may present a challenge. The listing management engine 218 provides a number of features (e.g., auto-relisting, inventory level monitors, etc.) to assist the seller in managing such listings.

A post-listing management engine 220 also assists sellers with a number of activities that typically occur post-listing. For example, upon completion of an auction facilitated by the one or more auction engines 204, a seller may wish to leave feedback regarding a particular buyer. To this end, the post-listing management engine 220 provides an interface to the reputation engine 210 allowing the seller to conveniently provide feedback regarding multiple buyers to the reputation engine 210.

A messaging engine 222 is responsible for the generation and delivery of messages to users of the networked system 102. Such messages include, for example, advising users regarding the status of listings and best offers (e.g., providing an acceptance notice to a buyer who made a best offer to a seller). The messaging engine 222 may utilize any one of a number of message delivery networks and platforms to deliver messages to users. For example, the messaging engine 222 may deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

The sizing recommendation engine 224 performs analysis to provide the sizing content recommendation. In example embodiments, the sizing recommendation engine 224 may determine a size of a user (i.e., sizing data) using a standard-sized marker as a guide. The sizing recommendation engine 224 then may use the sizing data to search for listings that contain items having matching sizing data. The sizing recommendation engine 224 will be discussed in more detail in connection with FIG. 3.

Although the various components of the publication system 120 have been defined in terms of a variety of individual modules and engines, a skilled artisan will recognize that many of the items can be combined or organized in other ways. Furthermore, not all components of the publication system 120 have been included in FIG. 2. In general, components, protocols, structures, and techniques not directly related to functions of example embodiments (e.g., dispute resolution engine, loyalty promotion engine, personalization engines, etc.) have not been shown or discussed in detail. The description given herein simply provides a variety of example embodiments to aid the reader in an understanding of the systems and methods used herein.

Figure 3:
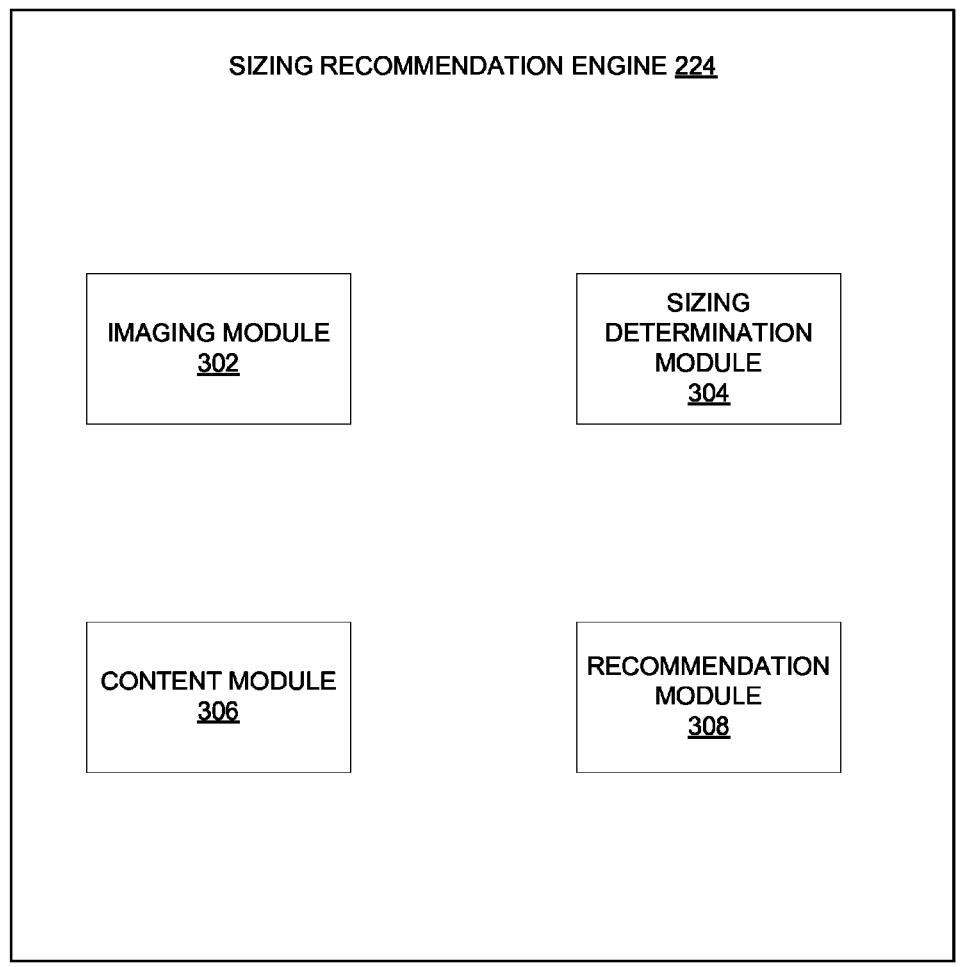
FIG. 3 is a block diagram illustrating an example embodiment of a sizing recommendation engine.

Application of Embodiments of the Sizing Content Recommendation System into the Example Network Architecture Referring now to FIG. 3, an example diagram of the sizing recommendation engine 224 is shown. In example embodiments, the sizing recommendation engine 224 comprises an imaging module 302, a sizing determination module 304, a content module 306, and a recommendation module 308. In alternative embodiments, one or more of the modules depicted within the sizing recommendation engine 224 may be located within another component of the publication system 120 (e.g., within the navigation engine 212 or imaging engine 214).

The imaging module 302 manages images uploaded into the publication system 120 for sizing recommendation. In example embodiments, an image showing a user and a marker is uploaded by the user. The image may be uploaded, in one embodiment, from a mobile device of the user (e.g., iPhone). The imaging module 302 receives the image and may associate the image with an account of the user. The imaging module 302 may further trigger the sizing determination module 304 to analyze the image. In some embodiments, the imaging module 302 may be embodied within the imaging engine 214.

The sizing determination module 304 determines sizing data for the user. The sizing determination module 304 may access the stored uploaded image or may be provided the image by the imaging module 302. In example embodiments, the image depicts at least the user and a marker. The marker is a standard-sized object that may be easily identified by an image recognition component of the sizing determination module 304. Examples of the marker include, but are not limited to, a standard doorway, a piece of 8.5"×11" paper, a dollar bill, a particular coin, or an iPhone. Any object that has a standard size which may be known to the sizing determination module 304 may be used as the marker.

In one instance, the user may stand in front of a mirror with her iPhone in her hand and take a picture of herself holding the iPhone. Then using messaging capabilities of the iPhone, the user may send the image to the imaging module 302. While an iPhone is given as an example, any mobile device or smartphone may be used to take a picture or transmit the image to the imaging module 302.

Once the marker is identified, dimensions of the marker are known by the sizing determination module 304. For example, the sizing determination module 304 may access a table of markers and their corresponding dimensions. Using the dimensions of the marker, a ratio may be applied to determine the sizing data (e.g., height, width) of the user. In example embodiments, the sizing data may be determined in terms of inches, feet, meters, U.S. sizes (e.g., 2, 4, 6), European sizes (e.g., 38, 40, 42), or any other type or form of sizing. In some embodiments, the sizing data may be stored in a user profile associated with the user for later use or may be immediately available for use. In alternative embodiments, the sizing data for the user may be obtained in other manners. For example, the user may input the sizing data into their profile or the user may indicate a friend that has similar sizing data.

The content module 306 determines content from the dynamic marketplace matching the sizing data and any search parameters received from the user. Initially, the content module 306 accesses the marketplace (e.g., content stored in the databases 126 via the database servers 124). The content in the marketplace may comprise inventory or listings of goods or services that a user (e.g., a seller) wishes to transact via the publication system 120 that are created by the listing creation engine 216 by other users. In one embodiment, the marketplace is a dynamic marketplace having listings that change (e.g., addition and removal of listings). However, it should be noted that embodiments of the present invention may be used in any type of marketplace (e.g., catalog, dynamic).

The content module 306 then performs a search for content matching the sizing data and the search parameters received by the navigation engine 212 (e.g., keywords provided by the user such as pants, dress, shirt). The matching content comprises a list of at least one item from the dynamic marketplace available for acquisition (e.g., purchase, auction, trade). For example, the content module 306 may take the sizing data (e.g., U.S. size 4, waist size 27", height size of 5'6") along with any keywords (e.g., jeans) or selected categories (e.g., women's apparel) and search for listings that contain same or similar sizing data and satisfy the keywords or categories.

The content module 306 may select listings that are within a particular margin of difference in size. For example, if the sizing data for the user indicates the user has a waist that is 28," the content module 306 may select listings that are within 1" of the sizing data (e.g., between 27" to 29"). The margin of difference may be a default amount or may be a preference set by the user.

The recommendation module 308 incorporates preferences and past interaction data in prioritizing the list of matching content for presentation to the user. In one embodiment, the recommendation module 308 incorporates user preferences stored in a user profile of the user. The user preferences may include particular colors, margin of size differences, brands, or any other preferences that may be stored in the user profile. In addition or alternatively, the recommendation module 308 may incorporate past purchase history of the user. For example, if the user has purchased particular brands or from a particular seller in the past, the matching content that are associated with these brands or sellers may be prioritized higher for presentation.

The recommendation module 308 may also, in addition or alternatively, incorporate user browsing history in prioritizing the content. For example, the user may have recently been browsing products of a particular brand or seller. In these cases, the content for these particular brands or sellers will be prioritized higher for presentation.

Interactions of other users may also be incorporated into the results in order to determine a priority for presentation. In example embodiments, purchase history of related users may be incorporated. The related users may be buddies or friends as indicated within the user profile or from a social networking site. The friends may have the same or very similar sizing data or have similar purchase or browsing histories. In some embodiments, the related users may be other users of the publication system 120 that have similar preferences, past purchase histories, or browsing histories.

In one embodiment, information used by the recommendation module 308 in prioritizing the list may be a default body of information. Alternatively or in addition, the user may adjust or set preferences for incorporation of various types of information for prioritization. For example, the user may indicate that the past purchase history is less relevant than browsing history over the last week or that only a particular related user's interactions should be considered (e.g., their best friend). Such weightings may be stored in the user's profile.

Figure 4:
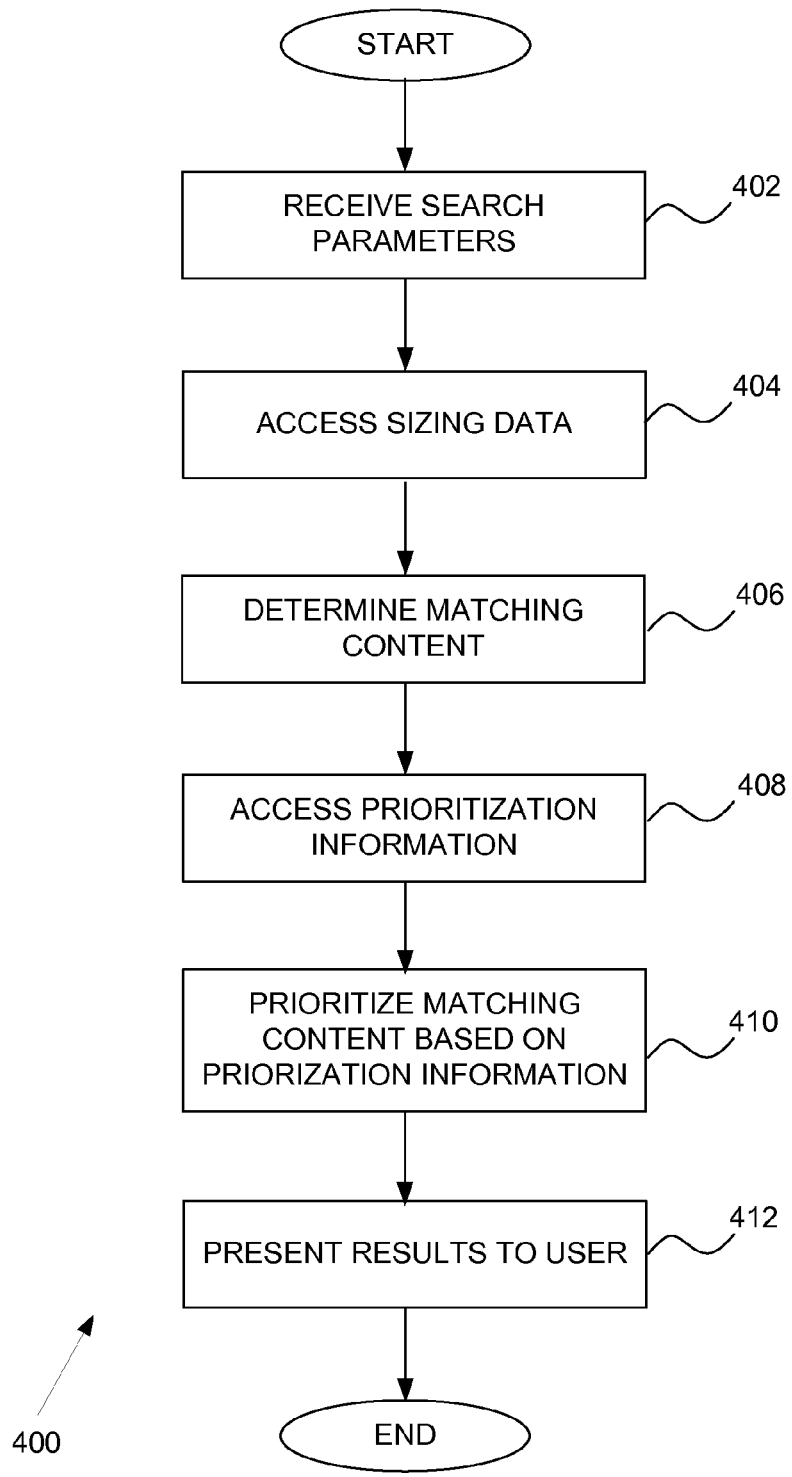
FIG. 4 is a flow diagram of an example method for providing sizing content recommendations.

FIG. 4 is a flow diagram of an example method 400 for providing sizing content recommendations. Initially, search parameters are received by the sizing recommendation engine 224 in operation 402. The search parameters may not include any sizing data. However, if the user is known to the publication system 120 (e.g., logged in), then the sizing data may be accessed in operation 404. The sizing data may be determined at any time and the results may be stored or otherwise associated with an account of the user with the publication system 120. An example method for determining sizing data will be discussed in more detail in connection with FIG. 5 below.

In operation 406, matching content is determined. In one embodiment, the content module 306 performs a search for content that matches the sizing data accessed in operation 404 as well the search parameters received in operation 402 (e.g., keywords and categories). The matching content, comprising a list of at least one item, is retrieved by the content module 306.

Prioritization information is accessed in operation 408 by the recommendation module 308. The prioritization information may be stored or otherwise associated with the user's account in the publication system 120.

Using the prioritization information, the matching content retrieved in operation 406 is prioritized in operation 410. The prioritization operation will be discussed in more detail in connection with FIG. 6 below.

Once prioritized, the results are presented to the user in operation 412. For example, the results may be transmitted to the client device of the user for display. The display may comprise a listing or grid including images and details of matching content. The user may then select a particular listing in order to obtain more detailed information regarding the item(s) being offered.

Figure 5:
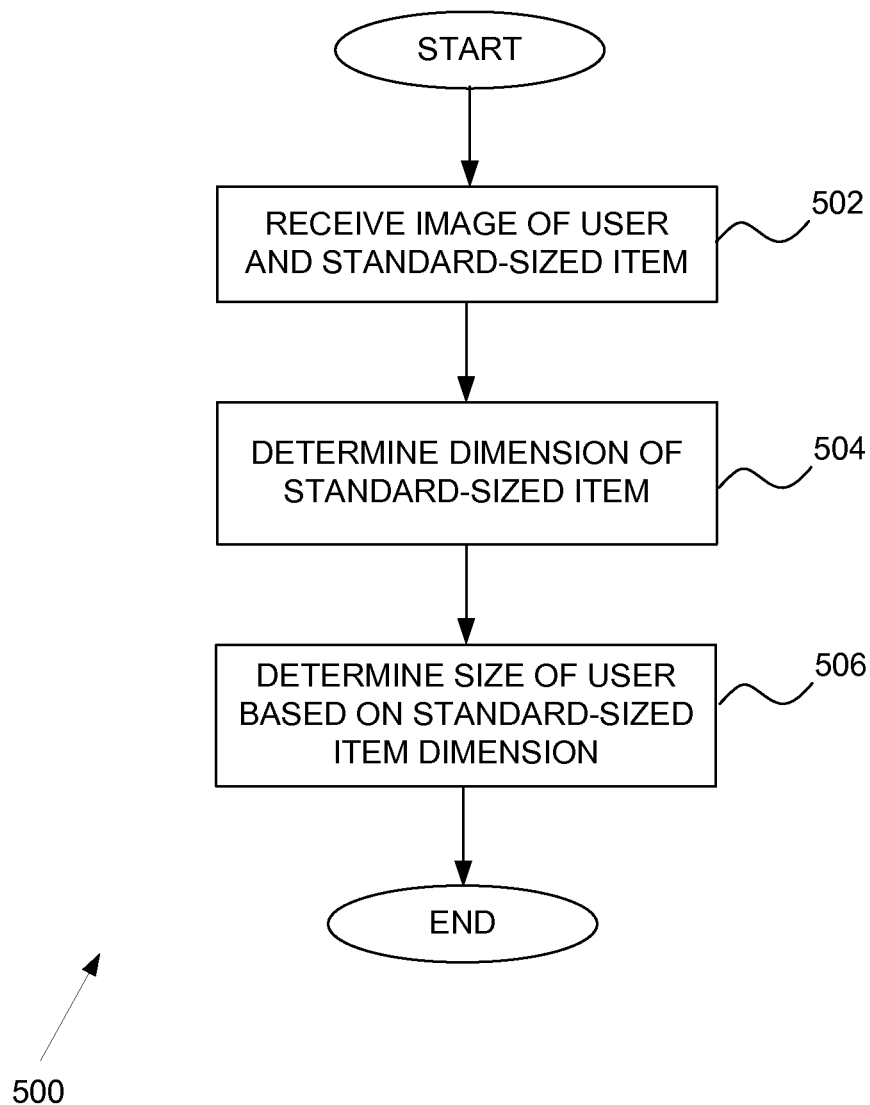
FIG. 5 is a flow diagram of an example method for determining sizing data for a user.

Referring now to FIG. 5, a flow diagram of an example method 500 for determining sizing data for a user is shown. The sizing data may be determined at any time and stored or otherwise associated with an account of the user. Subsequently, the sizing data may be accessed when a search is to be performed (e.g., operation 404 of FIG. 4). In operation 502, an image of the user and a standard-sized marker is received. In example embodiments, the imaging module 302 receives the uploaded image from the user and may associate the image with an account of the user.

One or more dimensions of the standard-sized item in the image are determined in operation 504. In one embodiment, an image recognition component of the sizing determination module 304 identifies the standard-sized marker. Alternatively, the user may indicate the standard-sized marker used. Once identified, the sizing determination module 304 determines the size of the standard-sized marker. For example, the sizing determination module 302 may access a table of markers and their corresponding dimensions.

Once the size of the standard-sized marker is determined, a size of the user may be determined in operation 506. In one embodiment, using the dimensions of the marker, a ratio may be applied to determine the sizing data (e.g., height, width) of the user based on the image size of the marker and the user. For example, assume the user is holding a piece of 8.5"×11" paper lengthwise (e.g., the paper is 11 inches long vertically) and the ratio of the paper to the user in the image is 1/6. Then, the height of the user is determined to be five feet, 6 inches. A similar algorithm may be applied to determine a width at a waist location.

It should be noted that in alternative embodiments, other manners for determining sizing data may be used. For example, the user may input some or all of their sizing data. In other example, the user may indicate a related user having the same sizing data as the user. In this example, the sizing data of the related user may then be associated with the user.

Figure 6:
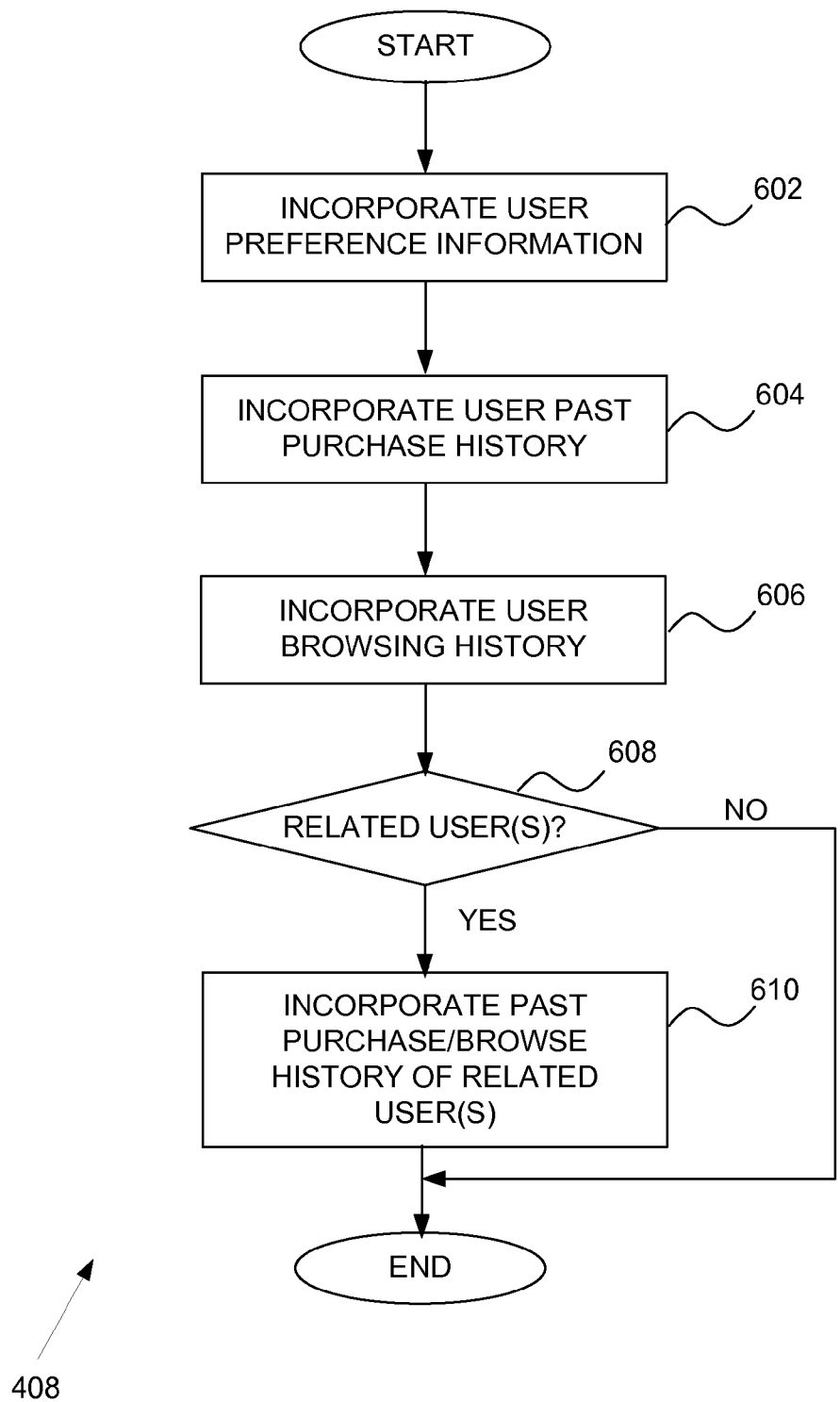
FIG. 6 is a flow diagram of an example method for determining prioritization of matching content.

Referring now to FIG. 6, a flow diagram of an example method for determining prioritization of matching content (operation 408) is shown. In example embodiments, the recommendation module 308 accesses prioritization data from (or associated with) the user's profile. In operation 602, user preference information is incorporated into the search results. For example, if the user has preferences information indicating a preference for sellers offering free shipping and accepting payment from PayPal™, Gucci™ brand products, and the color black, then these preferences will be incorporated into the search results, and results matching one or more of these preferences are higher in priority (e.g., the more preference matches, the higher the priority).

In operation 604, the recommendation module 308 may incorporate past purchase history of the user. For example, if the user has purchased particular brands or from a particular seller in the past, the matching content that are associated with these brands or sellers are prioritized higher for presentation.

The recommendation module 308 may also, in operation 606, incorporate user browsing history in prioritizing the content. For example, the user may have recently been browsing products of a particular brand or seller. In these cases, the content for these particular brands or sellers are prioritized higher for presentation.

In operation 608, a determination is made whether there is prioritization information from related users to be incorporated. The determination may be performed by the recommendation module 308. In some embodiments, the user may indicate a preference to have prioritization information from one or more related users (e.g., a buddy list) be incorporated. If so, the past purchase or browse histories of the related users are incorporated in order to determine a priority in operation 610. In other embodiments, the user may indicate a preference not to have any related users or not incorporate any prioritization information from one or more related users.

It is noted that not all forms of prioritization information may be used in every embodiment. For example, the user may indicate a desire to have preference information and their past purchase history be incorporated in the prioritization of the search results, but not use browsing history or any related user prioritization information. As such, any combination of prioritization information may be used in determining the priority for display of the search results.

Furthermore, different weights may be applied to each type of prioritization information. For instance, the user may indicate that user preference information is most important with their most recent browsing history being the next important followed by past purchase history. Thus, the prioritization of the search result will be weighted such that listings that match a combination of the user preference information, most recent browsing history, and past purchase history may be listed higher or more prominently than listings that only match a combination of user preference information and past purchase history.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Storage Medium

Figure 7:
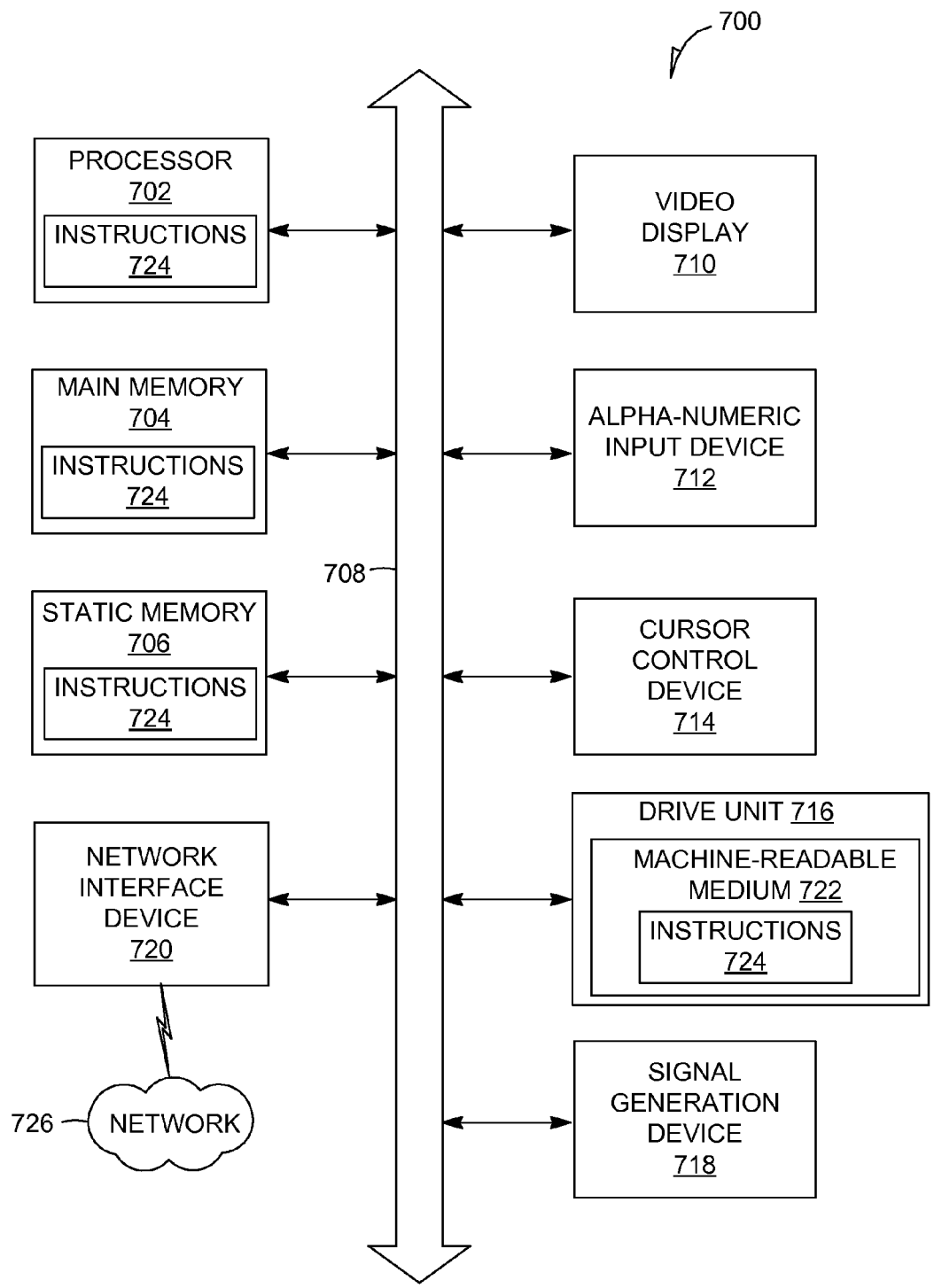
FIG. 7 is a simplified block diagram of a machine in an example form of a computing system within which a set of instructions for causing the machine to perform any one or more of the methodologies discussed herein may be executed.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In example embodiments, the computer system 700 also includes one or more of an alphanumeric input device 712 (e.g., a keyboard), a user interface (UI) navigation device or cursor control device 714 (e.g., a mouse), a disk drive unit 716, a signal generation device 718 (e.g., a speaker), and a network interface device 720.

Machine-Readable Storage Medium

The disk drive unit 716 includes a machine-readable storage medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, with the main memory 704 and the processor 702 also constituting machine-readable media.

While the machine-readable storage medium 722 is shown in an example embodiment to be a single medium, the term "machine-readable storage medium" may include a single storage medium or multiple storage media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that causes the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. The term "machine-readable storage medium" shall also be taken to include any non-transitory storage medium.

Transmission Medium

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived there from, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A non-transitory machine-readable storage medium in communication with at least one processor, the non-transitory machine-readable storage medium storing instructions which, when executed by the at least one processor, provides operations comprising:
   receiving a search parameter from a user;
   in response to the receiving of the search parameter, retrieving an attribute from an account of the user;
   performing a search for an item that matches the search parameter and the retrieved attribute from the account of the user;
   generating a prioritized list of one or more items that match the search parameter and the retrieved attribute; and causing presentation of the prioritized list of the one or more items to the user.

2. The non-transitory machine-readable storage medium of claim 1, wherein the operations further comprise compiling a list of the one or more items that match the retrieved attribute and the search parameter.

3. The non-transitory machine-readable storage medium of claim 2 wherein:
the generating the prioritized list of the one or more items comprises prioritizing the compiled list based on at least one user interaction.

4. The non-transitory machine-readable storage medium of claim 3, wherein the at least one user interaction comprises a selection from the group consisting of establishing user preference information in a profile of the user, one or more past purchases by the user, and a browsing history of the user.

5. The non-transitory machine-readable storage medium of claim 3, wherein the generating the prioritized list comprises:
determining whether to incorporate prioritization information from a related user; and
based on the determining, incorporating at least one of past purchase history of the related user or browsing history of the related user.

6. The non-transitory machine-readable storage medium of claim 1, wherein the attribute is sizing data.

7. The non-transitory machine-readable storage medium of claim 6, wherein the operations further comprise determining the sizing data for the user from an analysis of an image of the user and a standard-sized marker, the determining comprising:
accessing an image including the user and the standard-sized marker;
determining one or more dimensions of the standard-sized marker; and
determining the sizing data for the user based on the one or more dimensions of the standard-sized marker by applying a ratio.

8. The non-transitory machine-readable storage medium of claim 1, wherein the item is available via at least one vendor that is associated with a vendor computer system that comprises a marketplace where offerings of items are at least partially described by user-generated content.

9. The non-transitory machine-readable storage medium of claim 1, wherein the performing the search for the item comprises determining a matching item within a margin of difference to the attribute.

10. A system comprising:
a processor of a machine;
a navigation engine to receive a search parameter from a user;
a determination module to access an attribute from an account of the user in response to receiving the search parameter;
a content module to perform, using the processor of the machine, a search for an item matching the search parameter and the retrieved attribute from the account of the user; and
a recommendation module to generate a prioritized list of one or more items that match the search parameter and the retrieved attribute, and to cause presentation of the prioritized list of the one or more items to the user.

11. The system of claim 10, wherein the content module is further to compile a list of the one or more items that match the retrieved attribute and the search parameter.

12. The system of claim 11, wherein the recommendation module is to generate the prioritized list by prioritizing the compiled list based on at least one user interaction.

13. The system of claim 11, wherein the recommendation module is to generate the prioritized list by determining whether to incorporate prioritization information from a related user, and based on the determining, to incorporate at least one of past purchase history of the related user or browsing history of the related user.

14. The system of claim 10, wherein the attribute is sizing data.

15. The system of claim 14, wherein the determination module is to further determine the sizing data for the user from an analysis of an image of the user and a standard-sized marker by:
accessing an image including the user and the standard-sized marker;
determining one or more dimensions of the standard-sized marker; and
determining the sizing data for the user based on the one or more dimensions of the standard-sized marker by applying a ratio.

16. A method comprising:
receiving a search parameter from a user;
in response to the receiving of the search parameter, retrieving an attribute from an account of the user;
performing, using a hardware processor, a search for an item matching the search parameter and the retrieved attribute from the account of the user;
generating a prioritized list of one or more items that match the search parameter and the retrieved attribute; and
causing presentation of the prioritized list of the one or more items to the user.

17. The method of claim 16, further comprising:
compiling a list of the one or more items that match the retrieved attribute and the search parameter, wherein the generating the prioritized list comprises prioritizing the compiled list based on at least one user interaction.

18. The method of claim 16, wherein the attribute is sizing data.

19. The method of claim 18, further comprising determining the sizing data for the user from an analysis of an image of the user and a standard-sized marker, the determining comprising:
accessing an image including the user and the standard-sized marker;
determining one or more dimensions of the standard-sized marker; and
determining the sizing data for the user based on the one or more dimensions of the standard-sized marker by applying a ratio.

20. The method of claim 16, wherein the performing the search for the item comprises determining a matching item within a margin of difference to the attribute.

* * * * *

UNITED STATES PATENT AND TRADEMARK OFFICE
CERTIFICATE OF CORRECTION

| | | |
|---|---|---|
| PATENT NO. | : 8,762,388 B2 | Page 1 of 1 |
| APPLICATION NO. | : 13/872843 | |
| DATED | : June 24, 2014 | |
| INVENTOR(S) | : Yankovich et al. | |

It is certified that error appears in the above-identified patent and that said Letters Patent is hereby corrected as shown below:

IN THE CLAIMS:

In column 13, line 8, in Claims 3, after "wherein", delete ":", therefor

Signed and Sealed this
Ninth Day of December, 2014

Michelle K. Lee
*Deputy Director of the United States Patent and Trademark Office*